E. R. WOLCOTT.
METHOD AND APPARATUS FOR ELECTRICALLY PROMOTING CHEMICAL REACTIONS.
APPLICATION FILED OCT. 1, 1918.
1,402,128.
Patented Jan. 3, 1922.
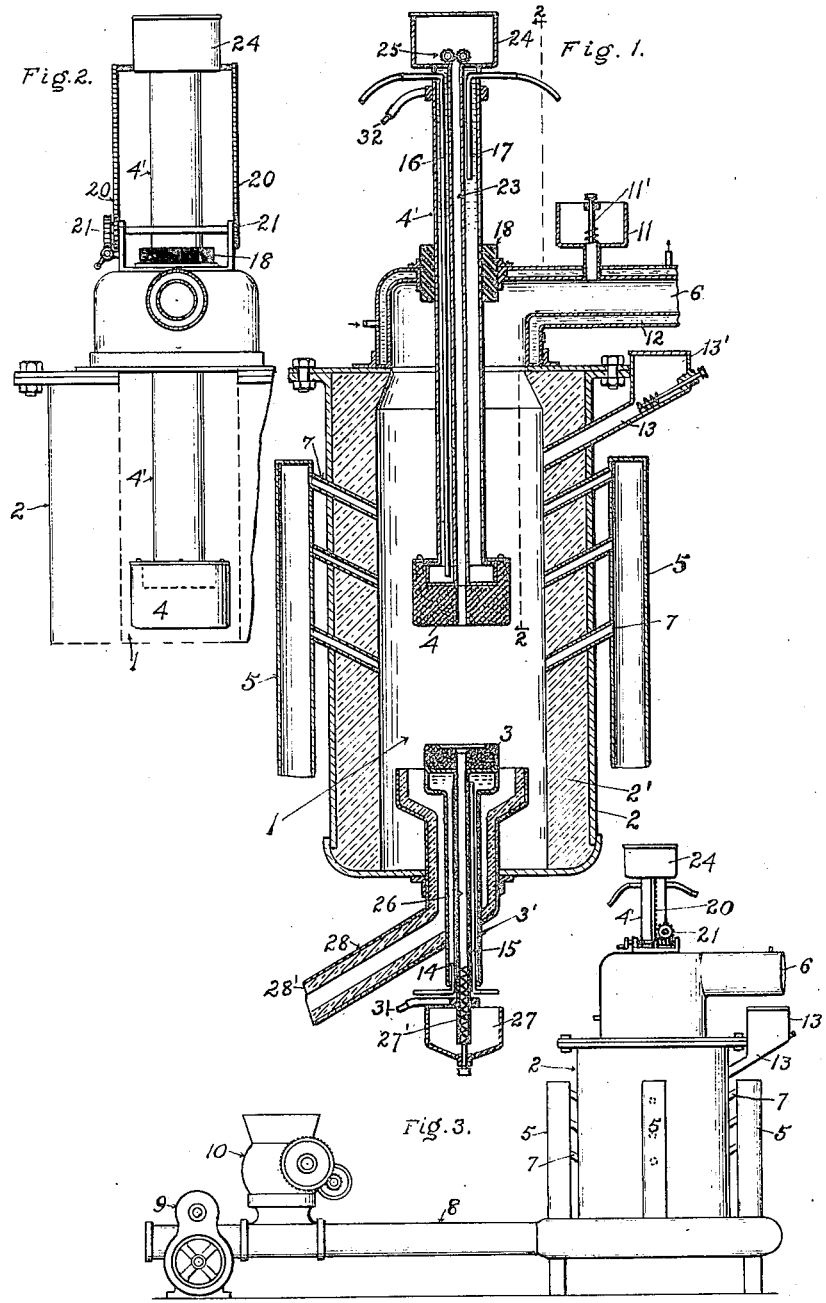
INVENTOR
Edson R. Wolcott
BY Arthur P. Knight
ATTORNEY

UNITED STATES PATENT OFFICE.

EDSON R. WOLCOTT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

METHOD AND APPARATUS FOR ELECTRICALLY PROMOTING CHEMICAL REACTIONS.

1,402,128.

Specification of Letters Patent.   Patented Jan. 3, 1922.

Application filed October 1, 1918. Serial No. 256,375.

*To all whom it may concern:*

Be it known that I, EDSON R. WOLCOTT, a citizen of the United States, residing at Los Angeles, in the county of Los Angeles and State of California, have invented a new and useful Method and Apparatus for Electrically Promoting Chemical Reactions, of which the following is a specification.

This invention relates to the art of promoting chemical reactions under the influence of a source of high temperature such as the electric arc. Among the important objects of my invention are the following: Effecting reactions between gases and solids; volatilizing certain portions of solids or liquids, so that reactions with gases may be effected, catalytic actions enhanced and waste heat utilized; providing solid or liquid catalysts, which are known to be efficient in promoting the reactions between gases; absorption of waste heat gaseous reactions and likewise producing a cooling of the gases to prevent dissociation of the desired product by the introduction of finely divided solids or liquids in such a manner as to effect a direct reaction with the gases, or volatilize a portion of said solid which reacts with the gases.

Another object of the invention in some cases is to provide a process whereby certain solid products may be obtained in finely divided form.

As specific illustrations of this invention, the following examples are cited: By the introduction of an alkali metal or oxide in finely divided solid condition into a chamber through which is passing nitrogen, which is subjected to the high temperature of an electric arc formed between carbon electrodes, combustion of the carbon and nitrogen is enhanced through the catalytic action of the alkali metal and in the cooler parts of the furnace a combustion with the alkali is effected producing an alkali cyanide. It is not necessary to introduce the alkali directly, but it may be introduced as a finely divided silicate, such as finely divided orthoclase from which the potassium oxide is volatilized, a suitable reagent, such as lime, being added if necessary, to effect the volatilization. Where it is desired to utilize the full heating value of the electric arc, as in the productions of oxides of nitrogen, from a mixture of oxygen and nitrogen, the finely divided material, such as feldspar (orthoclase) may be introduced just beyond the electric arc to assist in producing the desired cooling so as to prevent dissociation of the oxides of nitrogen and likewise effect a reaction between the oxides of nitrogen and the potassium oxide to produce potassium nitrite or with excess of oxygen to yield potassium nitrate.

A further advantage of this invention is the production of mineral products in a finely divided state, for example the volatilization of zinc from a zinc ore is a reducing atmosphere to yield finely divided metallic zinc.

The accompanying drawings illustrate an apparatus suitable for carrying out my invention and referring thereto:

Fig. 1 is a vertical section of the furnace.
Fig. 2 is a section on line 2—2 in Fig. 1.
Fig. 3 is a side elevation of the apparatus.

The apparatus illustrated in the drawing comprises a furnace chamber 1, having a refractory lining 2' supported in a metal jacket or casing 2, electrodes indicated at 3 and 4 between which the electric arc is produced, means such as pipes 5 for conveying a suitable gas or gases to the said furnace chamber, and a conduit 6, through which the products of reaction pass or are drawn from the furnace chamber. Electrodes 3 and 4 are provided with conducting connections 31 and 32 for supplying current thereto from a suitable source.

Pipes 5 may communicate with the furnace chamber 1 through suitable tuyeres or ducts 7 in the wall of the furnace chamber, said ducts preferably extending inwardly and downwardly. Pipes 5 are connected with a supply pipe 8 (see Fig. 3) which is supplied with compressed air or other gas by a pump 9. Suitable means such as indicated at 10 may be provided for feeding finely divided solid material into said pipe 8. A conduit 13 may be provided for feeding finely divided solid material to the furnace chamber, independently of the compressed gas supply, from a feed box 13'. If desired, means may also be provided for furnishing finely divided solid material into the effluent gases passing through outlet conduit 6, such means being indicated at 11 as a feed box discharging into the said conduit 6 and provided with feed mechanism 11'.

Suitable water jacketing may be provided for any part or parts of the furnace, which may require cooling as indicated at 12 for conduit 6.

The electrodes 3 and 4 may be formed of carbon or other suitable material and may be provided with water cooling means of any suitable construction; for example, water supply and outlet pipes 14 and 15 communicating with a metallic tubular stem 3′ for the lower electrode 3 and water supply and outlet pipes 16 and 17 communicating with a metallic tubular stem 4′ for the upper electrode 4. The stem 4′ of the upper electrode 4 is mounted to move vertically within the furnace chamber through an insulating bushing 18 in the top of the furnace and suitable means such as rack and pinion devices 20 and 21 are provided for vertically adjusting said electrode to control the length of the electric arc. The electrodes 3 and 4 are shown as provided with means for supplying therethrough a finely divided solid material. In case of the upper electrode 4 such means may consist of the duct or tube 23 extending longitudinally in such electrode and opening at its lower end into the furnace chamber and at its upper end into a feed box 24 containing the finely divided solid material, and provided with suitable means such as feeding devices 25 for continually feeding the finely divided solid material into the tube 23. The lower electrode 3 may be provided with a central duct 26 provided with suitable means, such as screw conveyor 27′ for forcibly feeding the finely divided solid material, through said duct from a bin 27. A chute 28, of suitable construction and lined if necessary with refractory material 28′ may be provided around the lower electrode to receive slag or melted residue therefrom and conduct the same away from the furnace.

The following examples of my process may be given:

In the production of compounds of nitrogen and oxygen, atmospheric air may be supplied, through the pipes 5 and ducts 7, to the furnace chamber, adjacent to the electric arc, and finely divided solid material such as feldspar (with suitable reagent, such as lime, if necessary) may be fed into such air by means 10, and forced along with such air into the reaction chamber 1 and is thereby brought in contact with the compounds of nitrogen and oxygen produced by the electric arc. In this case the finely divided solid material does not pass directly into the zone of highest temperature, namely the electric arc, but is applied to the products of reaction after they pass out of such zone. If desired, such finely divided material may be supplied independently of the air by feed means 13.

The products of reaction in the electric arc furnace are subjected to sudden cooling due to contact with the finely divided solid material, by absorption of heat in raising the temperature of such material, and in fusing or volatilizing the material or a constituent thereof, the efficiency of conversion or reaction by the electric arc are being hereby increased on account of the resulting decrease in dissociation of the product of reaction.

In the case of feldspar applied in this manner the process has the further advantageous effect of volatilizing potassium compound, which is thereby separated from the other constituents in a form in which it may be recovered for commercial use, such recovery being effected for example, by collecting the volatilized compound or fume passing from the furnace. Furthermore, such volatilized compound, under suitable conditions may be made to react with a product of the reaction produced by the electric arc. Thus in the particular case stated the potassium compound volatilized from the feldspar reacts with the gases present, including compounds of nitrogen and oxygen produced by the action of the electric arc, to form potassium nitrite or nitrate—according to the following equations:—

$$K_2O + 2NO_2 + O = 2KNO_3$$
$$K_2 + 2NO + O = 2KNO_2$$

The potassium nitrite or nitrate produced in this manner is conducted away from the furnace chamber, through conduit 6 to any suitable receiving or collecting means, wherein the final products of reaction (in the above example, potassium nitrite and nitrate) are recovered. The residual material of the feldspar, left after volatilization of the potassium compound therefrom may pass over with the final products aforesaid and be separated therefrom in any suitable manner, for example, by leaching and crystallization of the potassium salts.

The finely divided solid material may also be supplied directly to the arc or most highly heated zone, in case such material or a constituent thereof is required in the reaction taking place in such arc or zone. For example, in the production of cyanides, by action of an electric arc between carbon electrodes, in an atmosphere of nitrogen, feldspar may be fed into the arc through the duct 33 in the upper electrode, or the duct 26 in the lower electrode, or otherwise, and the nitrogen may be supplied through pipes 5. In this case the primary reaction is between the nitrogen and the carbon of one or both of the electrodes between which the arc is formed, but the potassium or potassium compound present in the arc promotes the reaction both by direct combination and by catalytic action. In case the finely divided solid material is fed in through the lower electrode, the result of the introduction of such material into the arc or highly heated zone may be to fuse such material, the potassium compound or other volatile substances being volatilized from the melted material and the residual slag running down through the chute 28. In this case, as in others, only one of the electrodes, for example, the upper electrode 4, may be composed of carbon, and the lower electrodes, 3, may be protected by the layer of melted material thereon as well.

Carbon in finely divided form may also be supplied with or without finely divided feldspar through any of the ducts 7, 32 or 26, so as to react with the nitrogen in the chamber 1, under the influence of the electric arc, thereby accelerating the production of cyanide and diminishing the consumption of the carbon electrodes.

The furnace may also be used for producing finely divided material; for example, by supplying finely divided zinc ore through the ducts in the lower electrode and maintaining a reducing atmosphere within the chamber 1, zinc may be volatilized and pass off as a fume of metallic zinc, which may be collected in any suitable manner.

What I claim is:

1. The process which consists in producing reaction between substances in gaseous phase, by the action of an electric arc, and bringing into contact with the products of such reaction while they are still at high temperature, finely divided solid material in such manner as to absorb heat from such products and thereby increase the efficiency of reaction, said finely divided material having a constituent which is volatilized by the heat so absorbed.

2. In the art of producing chemical reaction between substances by means of the electric arc, the method of absorbing heat from the products of reaction to increase the efficiency of reaction, and at the same time utilizing such heat, which consists in applying to the products of reaction, while still hot, solid material containing a constituent capable of volatilization by the heat absorbed from the said reaction products the electric arc being maintained during such operation.

3. In the art of producing chemical reaction between substances by means of the electric arc, the method of absorbing heat from the products of reaction to increase the efficiency of reaction, and at the same time utilizing such heat, which consists in applying to the products of reaction, while still hot, finely divided solid material containing a constituent capable of volatilization by the heat absorbed from the said reaction products, said constituent being capable of reacting with the products of reaction in the electric arc, so as to produce a final product different from the immediate product of the arc reaction.

4. In the art of producing chemical reaction between substances by means of the electric arc, the method of absorbing heat from the products of reaction to increase the efficiency of reaction, and at the same time utilizing such heat, which consists in applying to the products of reaction, while still hot, non-gaseous material containing a constituent capable of volatilization by the heat absorbed from the said reaction products, the electric arc being maintained during such operation.

5. The process which consists in supplying to an electric arc materials capable of reaction at the temperature of the arc and supplying to the arc a finely divided solid material having a constituent which is volatile under the heat of the arc, such volatilized material having a catalytic action on the reaction taking place in the arc.

6. The process which consists in supplying to an electric arc materials capable of reaction at the temperature of the arc and supplying to the arc a finely divided solid material having a constituent which is volatile under the heat of the arc, such finely divided solid material having a catalytic action on the reaction taking place in the arc.

7. In the art of producing chemical reaction between substances by means of the electric arc, the method of absorbing heat from the products of reaction to increase the efficiency of reaction, and at the same time utilizing such heat, which consists in applying to the products of reaction, while still hot, finely divided solid material containing a constituent capable of volatilization by the heat absorbed from the said reaction products, said constituent being capable of reacting with the products of reaction in the electric arc, so as to produce a final product different from the immediate product of the arc reaction, and said finely divided solid material also containing a constituent remaining as residual solid material after such volatilization, and removing such residual solid material and the volatilized material from the reaction zone to carry away heat therefrom.

In testimony whereof I have hereunto subscribed my name this 21st day of September, 1918.

EDSON R. WOLCOTT.